W. R. COLLINS.
STUFFING BOX.
APPLICATION FILED JUNE 14, 1913.

1,087,639.

Patented Feb. 17, 1914.

Inventor
W. R. COLLINS

Witnesses
Robert M. Sutphen
A. L. Hind

By Watson E. Coleman
Attorney

UNITED STATES PATENT OFFICE.

WILLIAM R. COLLINS, OF CHICAGO, ILLINOIS.

STUFFING-BOX.

1,087,639.    Specification of Letters Patent.    Patented Feb. 17, 1914.

Application filed June 14, 1913. Serial No. 773,727.

*To all whom it may concern:*

Be it known that I, WILLIAM R. COLLINS, a citizen of the United States, residing at Chicago, in the county of Cook and State of Illinois, have invented certain new and useful Improvements in Stuffing-Boxes, of which the following is a specification, reference being had to the accompanying drawings.

This invention relates to an improved stuffing box which is more particularly designed for use in connection with machines actuated by compressed air, such for instance as the drilling or tunneling machine disclosed in Patent No. 1,000,075, issued to me August 8, 1911.

The present invention has for its principal object the provision of improved means for tightening the packing rings or gaskets arranged in the stuffing box, whereby the escape of the compressed air is effectually prevented.

The invention has for another important object the provision of means mounted in the gear wheel fixed upon the drum or other journal through the medium of which the packing gland which rotates within the stuffing box may be moved longitudinally to compress and tighten the gaskets.

Another object of the invention is to provide a ring or annulus secured upon a drum, a second metal ring mounted upon said annulus, packing rings engaged against the opposite edges of said metal ring and means for holding the same against rotation with relation thereto, said metal rings having coinciding openings to receive air from a chamber provided in the packing box, the drum having longitudinal air passages to conduct the air to the drills or other parts to be operated, a gear wheel fixed upon one end of the drum to rotate the same, and set screws threaded in the gear wheel and engaged with the packing gland to move the same longitudinally and compress the packing rings.

The invention has for still another object to produce an improved stuffing box construction which is comparatively simple and highly efficient and serviceable in practical use, and is adaptable to compressed air operated drills of various constructions without appreciably increasing the cost of their manufacture.

With the above and other objects in view, the invention consists in the novel features of construction and the combination and arrangement of parts hereinafter more fully described, pointed out in the claims, and shown in the accompanying drawings, in which—

Figure 1:
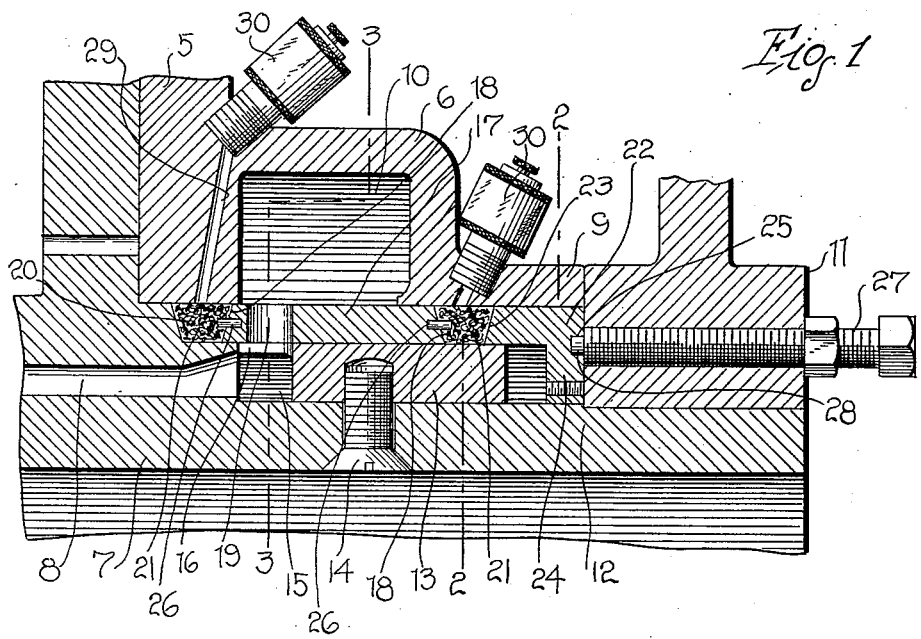
Figure 2:
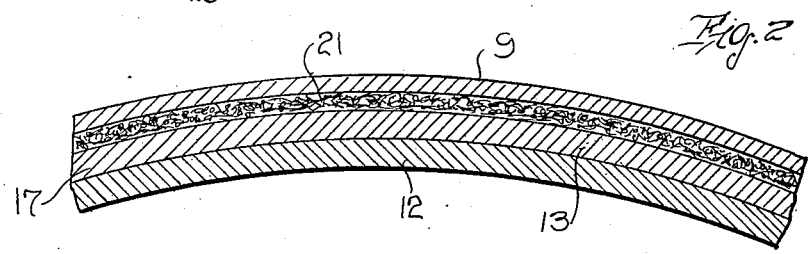
Figure 3:
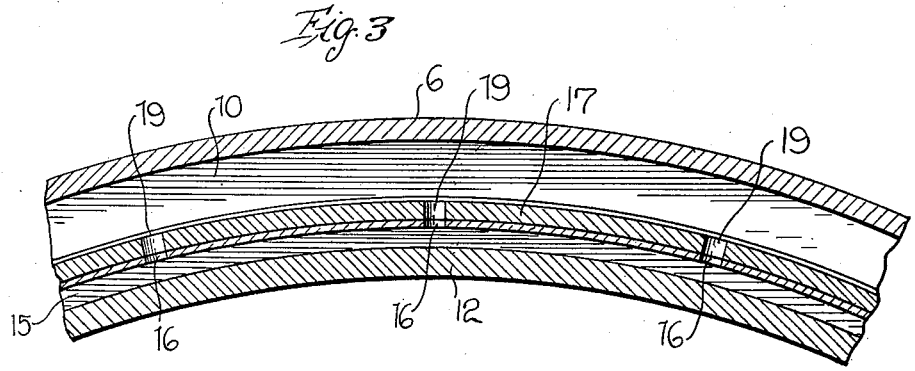

Figure 1 is a longitudinal section through one end of a drum upon which the cutting head carrying drills are adapted to be mounted. Fig. 2 is a section taken on the line 2—2 of Fig. 1. Fig. 3 is a section taken on the line 3—3 of Fig. 1.

Referring in detail to the drawing 5 designates a portion of a supporting frame which is provided with an extension 6 forming a bearing for the drum 7. This drum in the illustrated application of my invention, is adapted to carry the revoluble cutting head, upon which the drills are mounted, and the same is provided in its wall with a plurality of longitudinal passages 8, said passages corresponding in number to the number of drill carriers employed. Air is conducted by these passages to the several drills, the air being supplied to the passages through my improved stuffing box in the manner to be later described.

The extension 6 of the frame is reduced in diameter and longitudinally extended, as shown at 9, said frame extension in its large portion being provided with an air chamber 10 to which compressed air is adapted to be supplied from any suitable source in the usual manner. One end of the drum is extended beyond the reduced portion 9 of the frame and upon the same a gear wheel 11 is fixed, through the medium of which the drum is revolved. This gear is actuated by means of any suitable mechanism (not shown). It will be understood, as indicated at 12, that the wall of the revolving drum which extends through the stuffing box and beyond the same, is reduced in thickness, and upon this reduced portion of the drum, a cast iron ring or annulus 13 is securely fixed by means of the screws 14, said screws having their heads countersunk in the inner face of the drum, as shown. At one end of the annulus 13, the same is provided with an annular recess or chamber 15 and with the same a plurality of spaced slots or notches 16 formed in the end of the annulus 13 communicate. The longitudinal passages 8 in the wall of the drum are at all times in communication with the annular chamber 15 of the annulus 13. Upon this annulus a metal ring 17, preferably of brass, is arranged. The edges of this ring are oppositely inclined, as shown at 18, and adjacent to one edge the ring is provided with a circular series of openings 19 which afford communication between the general air supply chamber 10 and the annular chamber 15. The drum 7 is provided with an annular shoulder 20 which is beveled or inclined oppositely to the opposed beveled edge 18 of the ring 17.

21 designates a pair of packing rings or gaskets constructed of any suitable material. One of these rings is disposed between the inclined shoulder 20 and the opposed beveled edge 18 of the ring 17 and the other packing ring is arranged between the opposite beveled edge of the ring 17 and the opposed beveled edge 23 of the metal packing gland 22. This metal gland is closely engaged against the inner face of the reduced extension 9 of the frame bearing and is longitudinally movable with respect to the metal annulus 13. At its outer end the gland 22 is provided with an inwardly extending annular flange 24 in which a plurality of sockets 25 are formed, the purpose of which will be later explained.

The packing rings or gaskets 21 are held against rotation with respect to the rings 17 by means of a plurality of pins 26 which project laterally from the opposite edges of the ring 17 and engage in sockets or recesses formed in the packing rings. If desired, in lieu of these retaining pins, the beveled edges 18 of the ring 17 may be roughened or serrated so that they will grip the packing rings and counteract the tendency of the same to turn or rotate independently with said ring.

In order to compress the packing rings and tighten the same against the wall of the bearing and the periphery of the drum and the ring 13, I provide a plurality of screws 27, which have threaded engagement in the hub of the gear 11, as shown. These screws have reduced cylindrical extensions 28 formed on one end for engagement in the sockets or recesses 25 of the packing gland 22. As the flange 24 of the packing gland is spaced from the outer end face of the annulus 13, it will be obvious that by simply adjusting the screws 27 in the hub of the gear wheel, the packing gland 22 will be forced inwardly to move the outermost packing ring 21 and the metal ring 17, thereby compressing the inner packing ring 21, while a further adjustment compresses or tightens the outer packing ring. In this manner it will be obvious that the escape of air from the chamber 10 around the annulus 17 and gland 22 or between the drum and the supporting frame or bearing, is effectually prevented. The air, however, is continually supplied to the drills during the rotation of the drum through the coinciding openings and recesses 19 and 16 to the passages 8.

A suitable lubricant may be supplied to the packing rings 21 through the ducts 29 formed in the frame bearing, feed cups 30 being threaded in said bearing at the outer end of the ducts whereby the grease or other lubricant may be forcibly fed to the packing rings.

While in the drawings, I have illustrated only so much of the machine as is necessary to enable the invention to be clearly comprehended, it will be understood that both sides of the drum bearing are identical.

It is also to be remembered that the present invention is not limited in its utility or application to a drilling or tunneling machine, but is obviously applicable to all other machines which utilize compressed air as an actuating medium.

From the foregoing description taken in connection with the accompanying drawing, it is believed that the construction and manner of operation of my machine will be understood.

The invention as a whole is extremely simple in its construction, and it will, therefore, be at once appreciated that the same is highly durable as well as reliable and efficient in practical use. The several elements employed being all of simple form, may be manufactured at small cost, and readily replaced when necessary by new parts.

While I have shown and described the preferred construction and arrangement of the various parts, it will be understood that my invention is susceptible of considerable modification therein, and I have reserved the right to resort to all such legitimate changes as may be fairly embodied within the spirit and scope of the appended claims.

What is claimed, is:

1. The combination with a bearing, and a journal to rotate therein, a metal ring arranged between the journal and its bearing for movement independently thereof, packing rings engaged with the opposite edges of said metal ring, a longitudinally movable metal packing gland arranged in the bearing and engaged with one of said packing rings, a gear wheel fixed upon one end of the journal, and means adjustable in said gear wheel and engaging said packing gland to move the same in the bearing and compress the packing rings, said means also connecting said gland to the gear wheel for rotation therewith.

2. The combination with a bearing, and a journal to rotate therein, said journal having an annular shoulder, of a metal ring arranged upon the journal within said bearing, compressible packing rings engaged by the opposite edges of the metal ring, one of said packing rings engaging the annular shoulder of the journal, a longitudinally movable metallic packing gland arranged in the bearing and engaging the other packing ring, and means for adjusting said gland to move said metallic ring longitudinally in the bearing and compress the packing rings against the edges thereof and against the bearing wall.

3. The combination with a bearing and a journal to rotate therein, said bearing being provided with a fluid receiving chamber, said journal having longitudinal channels therein, of a metallic ring arranged between the journal and the bearing and provided with a series of openings affording communication between the bearing chamber and said channels, packing rings arranged at the opposite ends of the metal ring and means to prevent rotation of the packing rings with relation to the metal ring, said journal having an annular shoulder against which one of the packing rings is adapted to seat, and means longitudinally movable within the bearing and engaging the other packing ring to move the same and the metal ring longitudinally with respect to the journal and compress said packing rings against the edges of the metal ring and the wall of the bearing.

4. The combination with a bearing and a journal mounted to rotate therein, said bearing having a fluid receiving chamber, said journal provided with a plurality of longitudinal passages, of an annulus arranged within the bearing and fixed upon the journal, a metal ring engaged upon the annulus and arranged between the same and the fluid chamber of the bearing, said annulus having a fluid receiving chamber, said metal ring being provided with a series of openings connecting the chamber of the annulus with the chamber of the bearing, said journal being provided with an annular shoulder, packing rings arranged at the opposite ends of the metal ring, one of said packing rings being adapted to seat against the shoulder of the journal, a longitudinally movable metal packing gland arranged in the bearing and disposed between the annulus on the journal and the wall of the bearing, and means for moving said packing gland to move said metal ring longitudinally and compress the packing rings against the edges thereof and the wall of the journal.

5. The combination with a bearing and a journal to rotate therein, said bearing having a fluid receiving chamber and the journal provided with a plurality of longitudinal passages, a gear fixed upon the journal to rotate the same, of an annulus secured upon said journal within the bearing, a metal ring arranged between the annulus and the bearing wall, said annulus having a fluid receiving chamber formed therein, said ring being provided with a plurality of openings connecting the chamber in the bearing and the chamber in said annulus, the passages in the journal being in communication with the latter chamber, packing rings arranged at the opposite ends of said metal ring, said journal being provided with an annular shoulder against which one of the packing rings seats, a gland longitudinally movable in the bearing and engaged with the other packing ring, and means mounted in the gear wheel for adjusting said gland to move the packing rings and said metal ring and compress the packing rings against the wall of the bearing.

6. The combination with a bearing, and a journal mounted to rotate therein, said journal being provided with an annular shoulder, a gear wheel fixed on said journal to rotate the same, a metal ring arranged between the journal and the bearing, packing rings arranged at the opposite ends of the metal ring, one of said packing rings being adapted to seat against the shoulder on the journal, a metal packing gland longitudinally movable in the bearing and engaging the other of the packing rings and a plurality of adjusting screws threaded in the gear wheel and bearing against the packing gland to move the same in the bearing and compress the packing rings against the opposite edges of the metal ring and against the wall of the bearing.

7. The combination with a journal bearing and a journal to rotate therein, of a metal ring mounted upon the journal between the same and its bearing, pins projecting from opposite edges of said ring, packing rings arranged for engagement with the opposite edges of the metal ring, and means for compressing said packing rings against the edges of the metal ring and the wall of the bearing, whereby the pins in the metal ring will be embedded in the packing rings and hold the packing rings against rotation relative to the metal ring.

In testimony whereof I hereunto affix my signature in the presence of two witnesses.

WILLIAM R. COLLINS.

Witnesses:
E. W. COLLINS,
STEPHEN G. MARTIN.

---

Copies of this patent may be obtained for five cents each, by addressing the "Commissioner of Patents, Washington, D. C."